United States Patent

Saccomanno et al.

(10) Patent No.: US 11,038,413 B2
(45) Date of Patent: Jun. 15, 2021

(54) POWER CONVERTER WITH OVERSHOOT COMPENSATION FOR A SWITCHING DEVICE

(71) Applicant: Apple Inc., Cupertino, CA (US)

(72) Inventors: Giovanni Saccomanno, Munich (DE); Bogdan-Eugen Matei, Munich (DE); Fabio Ongaro, Unterhaching (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/566,784

(22) Filed: Sep. 10, 2019

(65) Prior Publication Data

US 2021/0075321 A1 Mar. 11, 2021

(51) Int. Cl.
| | | |
|---|---|---|
| *H02M 1/088* | (2006.01) | |
| *H02M 3/158* | (2006.01) | |
| *H02M 1/32* | (2007.01) | |
| *H02M 1/00* | (2006.01) | |

(52) U.S. Cl.
CPC ............ *H02M 1/088* (2013.01); *H02M 1/32* (2013.01); *H02M 3/1588* (2013.01); *H02M 2001/0029* (2013.01)

(58) Field of Classification Search
CPC ...... H02M 1/088; H02M 1/32; H02M 3/1588; H02M 1/08; H02M 2001/0029
See application file for complete search history.

(56) References Cited

U.S. PATENT DOCUMENTS

| | | | |
|---|---|---|---|
| 6,801,146 B2 | 10/2004 | Kernahan et al. | |
| 2003/0128047 A1* | 7/2003 | Humphrey | H03K 17/164 326/30 |
| 2006/0250183 A1* | 11/2006 | Zhao | H03F 3/72 330/251 |
| 2016/0301306 A1* | 10/2016 | Jiang | H02M 1/44 |
| 2017/0012618 A1* | 1/2017 | Krishna | H03K 17/165 |
| 2017/0085183 A1 | 3/2017 | Notsch | |
| 2018/0309366 A1* | 10/2018 | Zhang | H03K 17/166 |
| 2019/0265744 A1* | 8/2019 | Tajima | G01R 19/165 |
| 2020/0153429 A1* | 5/2020 | Butenhoff | H02P 27/00 |

FOREIGN PATENT DOCUMENTS

EP    0940061    7/2006

\* cited by examiner

*Primary Examiner* — Harry R Behm
(74) *Attorney, Agent, or Firm* — Kowert, Hood, Munyon, Rankin & Goetzel, P.C.

(57) ABSTRACT

A power converter circuit that includes a switch node coupled to a regulated power supply node via an inductor may, in response an assertion of a control signal, source current to the regulated power supply node. In response to initiating a charge cycle, a control circuit may assert the control signal. During an assertion of the control signal, the control circuit may adjust a slope of a transition of the control signal using a voltage level of the switch node.

20 Claims, 9 Drawing Sheets

POWER CONVERTER WITH OVERSHOOT COMPENSATION FOR A SWITCHING DEVICE

BACKGROUND

Technical Field

Embodiments described herein relate to integrated circuits, and more particularly, to techniques for generating regulated power supply voltages.

Description of the Related Art

Modern computer systems may include multiple circuits blocks designed to perform various functions. For example, such circuit blocks may include processors, processor cores configured to execute software or program instructions. Additionally, the circuit blocks may include memory circuits, mixed-signal or analog circuits, and the like.

In some computer systems, the circuit blocks may be designed to operate at different power supply voltage levels. Power management circuits may be included in such computer systems to generate and monitor varying power supply voltage levels for the different circuit blocks.

Power management circuits often include one or more power converter circuits configured to generated regulator voltage levels on respective power supply signals using a voltage level of an input power supply signal. Such regulator circuits may employ multiple passive circuit elements, such as inductors, capacitors, and the like.

SUMMARY OF THE EMBODIMENTS

Various embodiments of a power converter circuit are disclosed. Broadly speaking, a power converter circuit is contemplated, in which a switch node is coupled to a regulated power supply node via an inductor. The power converter circuit may be configured to source a charge current to the switch node, in response to an assertion of a control signal. A control circuit may be configured to, in response to an initiation of charge cycle, assert the control signal. The control circuit may be further configured to adjust, during an assertion of the control signal, a slope of a transition of the control signal using a voltage level of the switch node. In another non-limiting embodiments, the control circuit may be further configured to adjust the slope of the transition of the control signal using a plurality of control bits.

BRIEF DESCRIPTION OF THE DRAWINGS

The following detailed description makes reference to the accompanying drawings, which are now briefly described.

Figure 1:
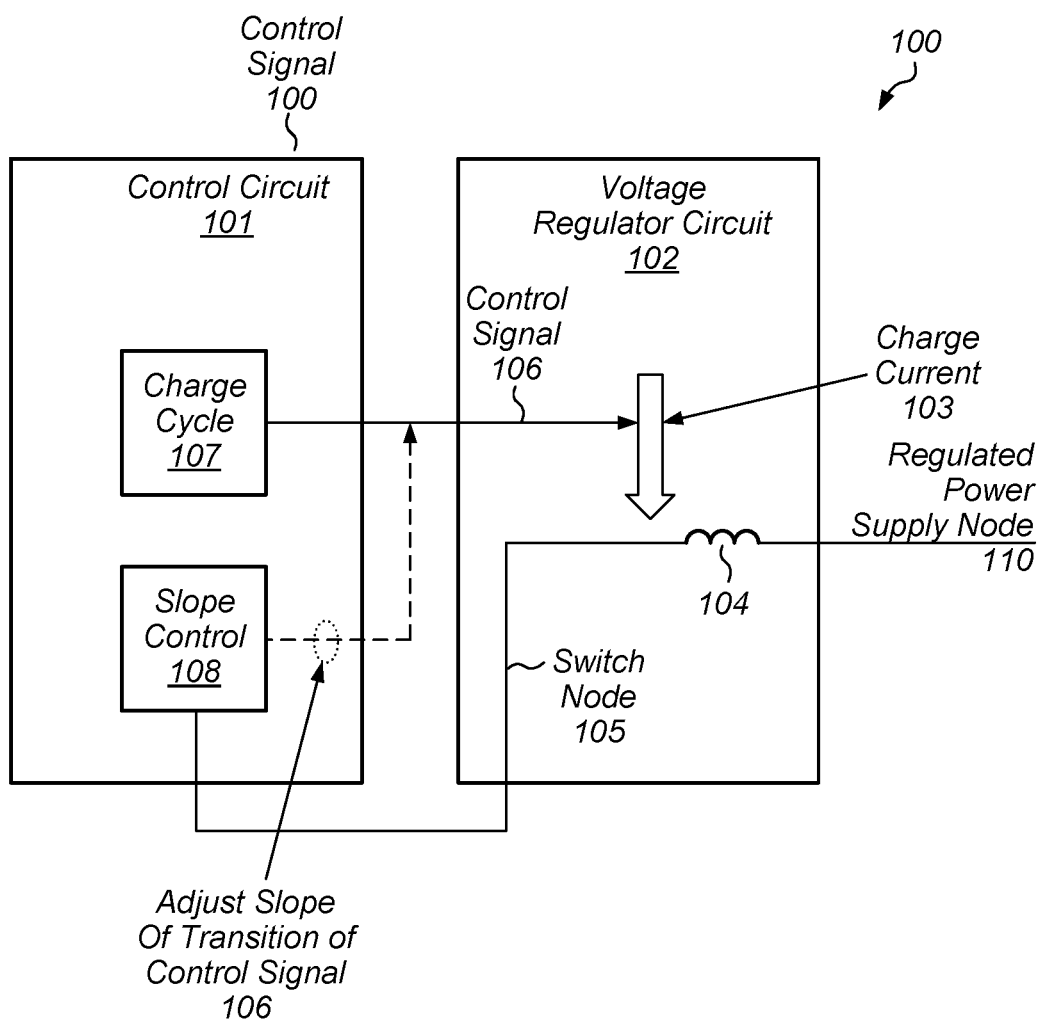
FIG. 1 illustrates a block diagram of an embodiment of a power converter circuit.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. The phrase "based on" is thus synonymous with the phrase "based at least in part on."

DETAILED DESCRIPTION OF EMBODIMENTS

Computer systems may include multiple circuit blocks configured to perform specific functions. Such circuit blocks may be fabricated on a common substrate and may employ different power supply voltage levels. Power management units (commonly referred to as "PMUs") may include multiple power converter circuits configured to generate regulated voltage levels for various power supply signals. Such power converter circuits may employ regulator circuit that includes both passive circuit elements (e.g., inductors, capacitors, etc.) as well as active circuit elements (e.g., transistors, diodes, etc.).

Different types of voltage regulator circuits may be employed based on power requirements of load circuits, available circuit area, and the like. One type of commonly used voltage regulator circuit is a buck converter circuit. Such buck converter circuits include multiple devices (also referred to as "switching device") and a switch node that is coupled to a regulated power supply node via an inductor. Particular ones of the multiple devices are then activated to periodically charge and discharge the switch node in order to maintain a desired voltage level on power supply node.

Such switching devices may include power field-effect transistors (FETs) which are used to couple load circuits to input power supplies during the regulation process. In some cases, the load circuits may be located on a different integrated circuit and parasitic circuit elements, e.g., parasitic inductance, can result in voltage overshoots across terminals of the switching devices. Such voltage overshoots may result in the switching device exceeding their respective safe operating areas (SOAs), which can degrade the switching devices or cause the switching devices to fail.

To reduce voltage overshoots across the switching devices, some computer systems may slow down a speed with which a driver circuit drives a switching device. Such an approach, however, may increase power consumption (referred to as "switching losses") during the extended transition by allowing multiple switching devices to be active at the same time. Other computer systems may employ clamp circuits to prevent voltage overshoot across the switching devices. Still other computer systems may employ analog control loops to regulate a slew rate of the switching devices activation. Such solutions may also increase power consumption of the power converter circuit.

The embodiments illustrated in the drawings and described below may provide techniques for operating a power converter circuit using a voltage level of the switch node to adjust the strength of a driver circuit coupled to a switching device during the switching process. By using the voltage level of the switch node to the strength of the driver circuit during the switching process, voltage overshot across the switching devices may be reduced without a large increase in power consumption.

A block diagram depicting an embodiment of a power converter circuit is illustrated in FIG. 1. As illustrated, power converter circuit 100 includes control circuit 101 and voltage regulator circuit 102.

Voltage regulator circuit 102 includes switch node 105 coupled to regulated power supply node 110 via inductor 104. In various embodiments, voltage regulator circuit 102 is configured, in response to an initiation of an assertion of control signal 106, to source charge current 103 to switch node 105. It is noted that although a single voltage regulator circuit is depicted in the embodiment of FIG. 1, in other embodiments, multiple voltage regulator circuits (collectively "phase units" or "phase circuits") may be coupled to regulated power supply node 110, in parallel, and operated with different timings (or "phases").

As noted above, the transition of control signal 106 as it is asserted may be adjusted to reduce voltage overshoot across switching devices in voltage regulator circuit 102. As illustrated in FIG. 1, control circuit 101 is configured, in response to an initiation of charge cycle 107, assert control signal 106.

Control circuit 101 is further configured to adjust, during an assertion of control signal 106, a slope of a transition of control signal 106 using a voltage level of switch node 105. As described below in more detail, control circuit 101 may be also be configured to adjust the slope of the transition of control signal 106 using a plurality of control bits. By adjusting the slope of the transition of control signal 106, voltage overshoots across switching devices included in voltage regulator circuit 102 may be reduced, thereby by preventing failure or degradation of the switching devices.

In various embodiments, control circuit 101 senses when the voltage level of switch node 105 begins to increase, and after a programmable delay, control circuit 101 changes the slope of control signal 106. The programmable delay may be determined by combining multiple currents. To sense the change in the voltage level of switch node 105, control circuit 101 may be further configured to generate a first current using the voltage level of switch node 105. As described below in more detail, control circuit 101 may be also configured to generate a second current using a plurality of devices that is a replica of the plurality of devices coupled to control signal 106 as well as replicas of devices included in voltage regulator circuit 102. In some embodiments, control circuit 101 may adjust the slope of the transition of the control signal using a combination of the first current and the second current.

As used herein, a replica device (or "a replica of a device") refers to a device that is a copy of a particular device, but that is not connected to the same load circuit as the particular device. In some cases, the physical design of the replica device may be the same as the physical design of the particular device by employing similar mask design used in conjunction with a semiconductor manufacturing process.

Figure 2:
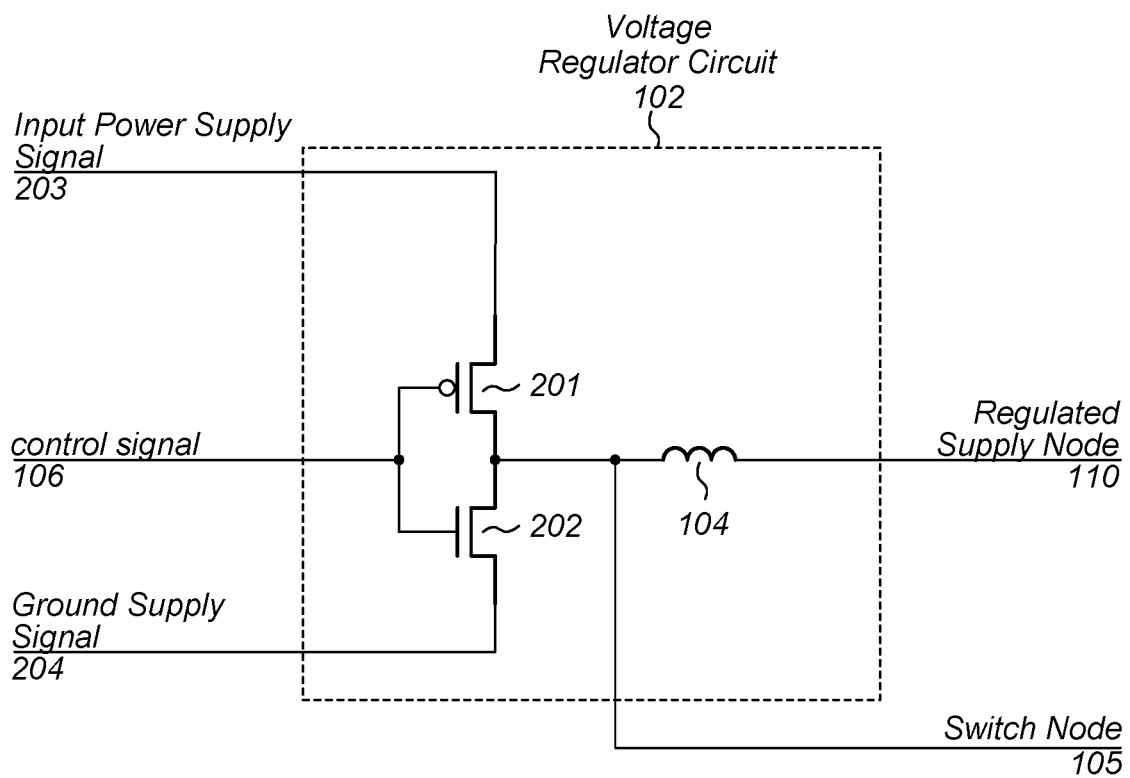
FIG. 2 illustrates schematic diagram of an embodiment of a regulator circuit.

Voltage regulator circuits, such as voltage regulator circuit 102, may be designed according to one of various design styles. A schematic diagram of a particular embodiment of voltage regulator circuit 102 is depicted in FIG. 2. As illustrated, voltage regulator circuit 102 includes devices 201 and 202, which are both coupled to switch node 105, and controlled by control signal 106.

In various embodiments, control circuit 101 may generate control signal 106, which used to activate one of devices 201 and 202 during charge and discharge cycles. During a charge cycle, current is sourced from input power supply node 203 to switch node 105, and during a discharge cycle, current is sunk from switch node 105 into ground supply node 204. Alternating between charge and discharge cycles, and adjusting the duration of either of the charge or discharge cycles may maintain a desired voltage level maintained on regulated power supply node 110.

Device 201 is coupled between input power supply node 203 and switch node 105, and is controlled by control signal 106. During a charge cycle, control signal 106 is asserted, which activates device 201 and couples input power supply node 203 to switch node 105, thereby charging switch node 105 by allowing a current to flow from input power supply node 203 to switch node 105, and then onto regulated power supply node 110.

As used herein, asserting, or an assertion of, a signal refers to setting the signal to a particular voltage level that activates a circuit or device coupled to the signal. The particular voltage level may be any suitable value. For example, in the case where device 201 is p-channel MOSFET, control signal 106 may be set to a voltage at or near ground potential when activated.

Device 202 is coupled between switch node 105 and ground supply node 204, and is also controlled by control signal 106. During a discharge cycle, control signal 106 is set to a voltage level, which activates device 202 and couples switch node 105 to ground supply node 204, thereby providing a conduction path from regulated power supply node 110 through inductor 104 into ground supply node 204. While device 202 is active, current flows from regulated power supply node 110 into ground supply node 204, decreasing the voltage level of regulated power supply node 110.

Device 201 and device 202 may be particular embodiments of MOSFETs. In particular, device 201 may be a particular embodiment of a p-channel MOSFET and device 202 may be a particular embodiment of an n-channel MOSFET. Although only two devices are depicted in the embodiment of FIG. 2, in other embodiments, any suitable number of devices, coupled in series or parallel, may be employed to achieve particular electrical characteristics (e.g., on-resistance of the devices).

Figure 3:
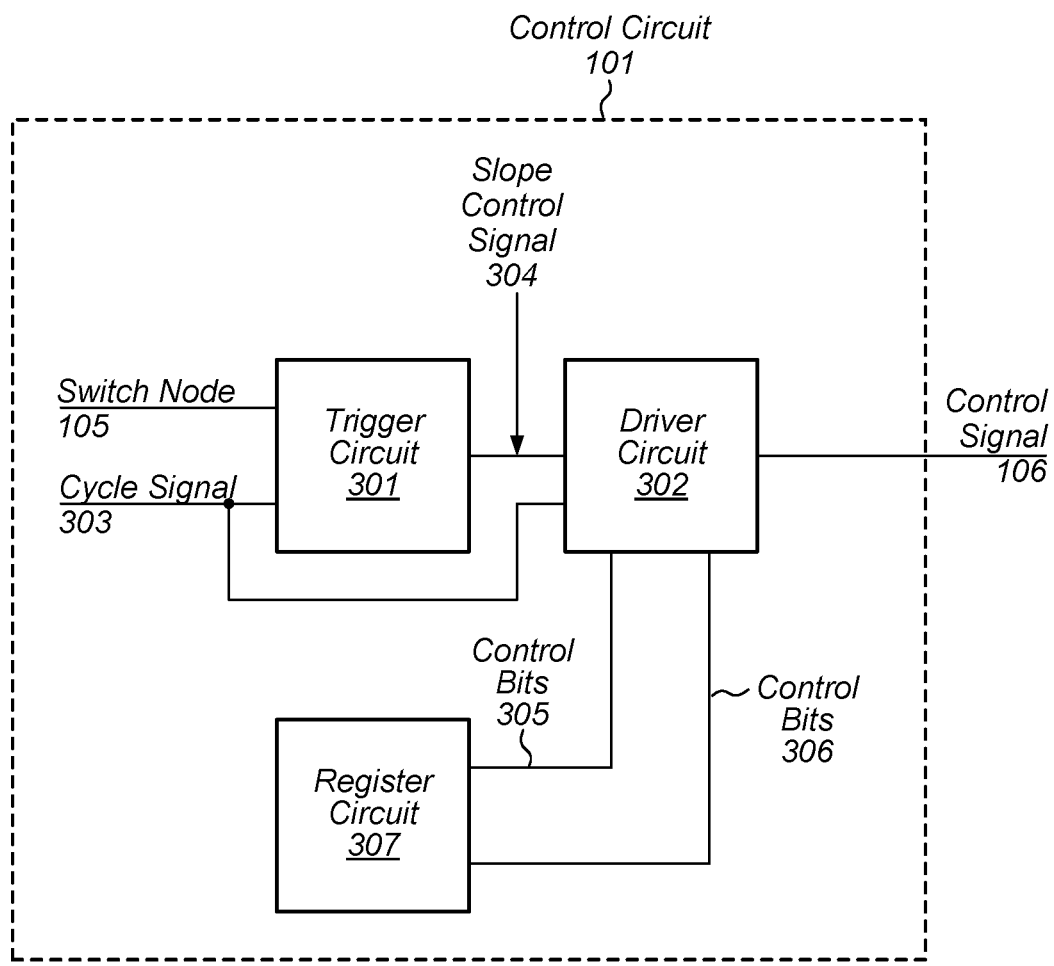
FIG. 3 illustrates a block diagram of an embodiment of a control circuit for a power converter circuit.

A block diagram of an embodiment of control circuit 101 is depicted in FIG. 3. As illustrated, control circuit 101 includes trigger circuit 301, driver circuit 302, and register circuit 307.

Trigger circuit 301 is configured to generate slope control signal 304 using cycle signal 303 and a voltage level of switch node 105. As described below in more detail, trigger circuit 301 may generate and combine multiple currents to determine at which point to trigger (or activate) slope control signal 304. In various embodiments, cycle signal 303 may be a clock or other timing signal, and may be generated by a control loop circuit (not shown) that govern the duration of a charge or discharge cycle of power converter circuit 100.

Driver circuit 302 is configured to generate control signal 106 using slope control signal 304 and cycle signal 303. In various embodiments, driver circuit 302 may be configured to assert control signal 106 using cycle signal 303. Driver circuit 302 may be further configured to, during an assertion of control signal 106, to modify a slope of control signal 106 using slope control signal 304 and control bits 305 and 306. In some cases, to modify the slope of the control signal 106, driver circuit 302 may be further configured to increase a transition time of the assertion of control signal 106. In various embodiments, the increase in transition time may be a result of a decrease in a slope of the transition of control signal 106. As used herein, a transition time of a signal refers to a time for the signal to change from one logic state to another logic state. For example, in the illustrated embodiment, driver circuit 302 may be configured to increase an amount of time for control signal 106 to transition for a logical-1 value to a logical-0 value. A magnitude of the change in the transition time (or slope) of control signal 106 may be based, at least in part, on control bits 305 and 306.

Register circuit 307 is configured to store control bits 305 and control bits 306. As described below in more detail, control bits 306 may be used to adjust the strength of a pull-up driver circuit, and control bits 305 may be used to adjust the strength of a pull-down circuit. In various embodiments, register circuit 307 may include multiple storage circuits, e.g., latch circuit or flip-flop circuits, each configured to store a single bit of control bits 305 and 306. It is noted that any suitable number of storage circuits may be employed.

Structures such as those shown in FIGS. 2 and 3 for generating a voltage level on a regulated power supply node may be referred to using functional language. In some embodiments, these structures may be described as including "a means for sourcing a charge current to the switch node in response to an assertion of a control signal," "a means for, in response to an initiation of a charge cycle, asserting the control signal," and "a means for adjusting, during an assertion of the control signal, a slope of a transition of the control signal using a voltage level of the switch node."

The corresponding structure for "means for sourcing a charge current to the switch node during a charge cycle" is voltage regulator circuit 102 as well as equivalents of this circuit. The corresponding structure of "a means for sourcing a charge current to the switch node in response to an assertion of a control signal" is driver circuit 302 and its equivalents. The corresponding structure for "a means for adjusting, during an assertion of the control signal, a slope of a transition of the control signal using a voltage level of the switch node" is trigger circuit 301 and driver circuit 302 and their equivalents.

Figure 4:
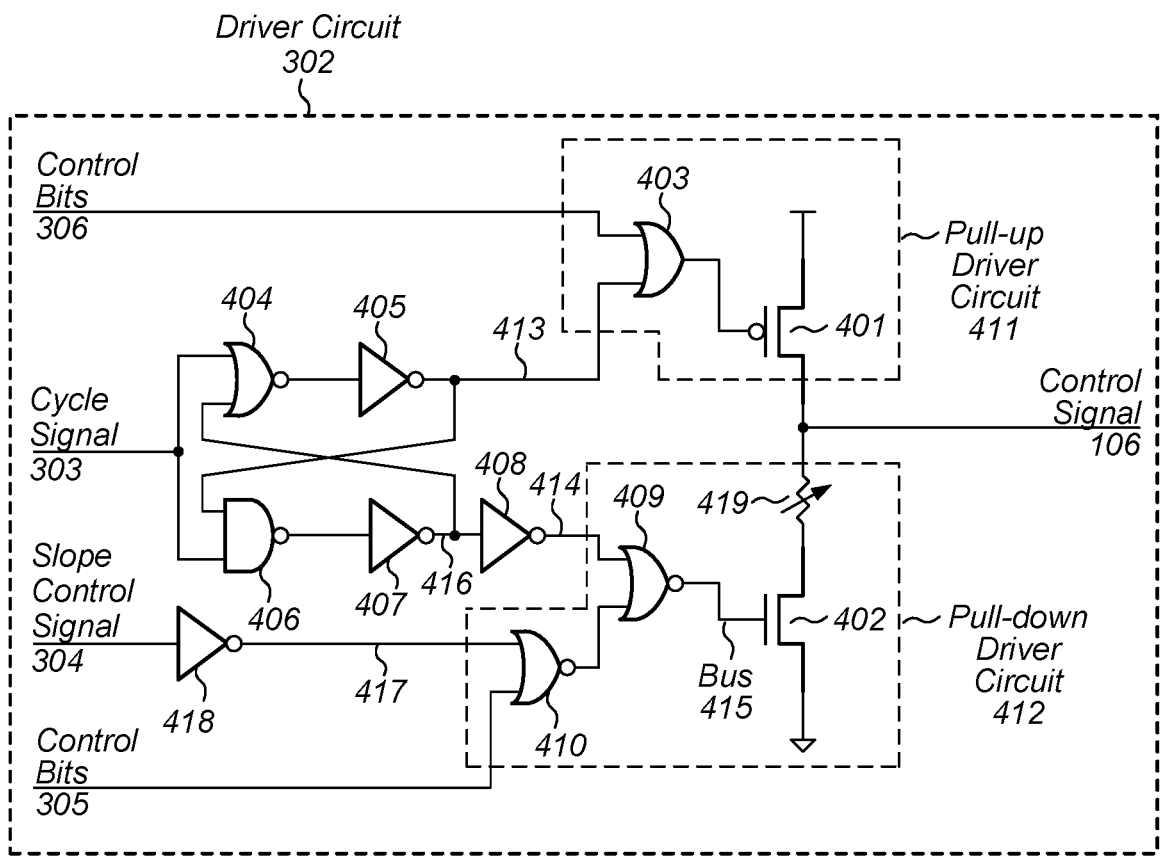
FIG. 4 illustrates a block diagram of an embodiment of a driver circuit.

A block diagram of an embodiment of driver circuit 302 is depicted in FIG. 4. As illustrated, driver circuit 302 includes pull-up driver circuit 411, pull-down driver circuit 412, inverters 405, 407, 408, and 418, NOR gate 404, and NAND gate 406. Pull-up driver circuit 411 includes OR gate 403 and device 401. Pull-down driver circuit 412 includes NOR gates 410 and 409, variable resistor 419, and device 402.

As described below in more detail, device 401 and OR gate 403, which are included in pull-up driver circuit 411, may include multiple devices and gates, respectively, connected in parallel. In such cases, different ones of control bits 306 may be coupled to respective ones of the multiple OR gates that are included in OR gate 403.

In a similar fashion, and as described below in more detail, device 402, NOR gate 409, and NOR gate 410 may include multiple devices and gates, respectively, coupled in parallel. Each of control bits 305 may be coupled to a respective one of the multiple NOR gates included in NOR gate 410. Additionally, each output of the multiple NOR gates included in NOR gate 410 may be coupled to an input of a respective on of the multiple NOR gates included in NOR gate 409. Lastly, each output of the multiple NOR gates included in NOR gate 409 may be coupled to a control terminal of a respective one of the multiple devices included in device 402. Device 402 is coupled to a ground supply node and is also coupled to control signal 106 via variable resistor 419. Variable resistor 419 may be a metal resistor, polysilicon resistors, or any other suitable type of resistor available on a semiconductor manufacturing process. In various embodiments, the value of variable resistor 419 is selected post-manufacture to fine tune the performance of pull-down driver circuit 412.

Cycle signal 303 is coupled to inputs of NOR gate 404 and NAND gate 406. The output of NOR gate 404 is coupled to the input of inverter 405, whose output is coupled to node 413, which is also coupled to the input of NAND gate 406. The output of NAND gate 406 is coupled to the input of inverter 407, whose output is coupled to NODE 416, which is also coupled to an input of NOR gate 404 and the input of inverter 408. The output of inverter 408 is coupled to node 414. It is noted that the combination of NOR gate 404, inverter 405, NAND gate 406 and inverter 407 may, in various embodiments, function as a set-reset (SR) latch.

Slope control signal 304 is coupled to the input of inverter 418, whose output is coupled to node 417. In response to a transition of slope control signal 304 to a high logic value, inverter 418 generates a low logic value on node 417. As described below in more detail, a low logic value on node 417 enables NOR gate 410, allowing control bits 305 to selectively activate particular lines of bus 415, thereby adjusting a number of devices 402 that are active.

As used and described herein, a logical-0, logic 0 value or low logic level, describes a voltage sufficient to activate a p-channel metal-oxide semiconductor field effect transistor (MOSFET), and a logical-1, logic 1 value, or high logic level describes a voltage level sufficient to activate an n-channel MOSFET. It is noted that, in various other embodiments, any suitable voltage levels for logical-0 and logical-1 may be employed.

During a discharge cycle, cycle signal 303 is at a high logic level, which results in node 413 being at a low logic level. Values of the respective outputs of the multiple OR gates included in OR gate 403 may be based, at least in part, on the values of corresponding ones of control bits 306. By adjusting the values of control bits 306, different numbers of the multiple devices included in device 401 may be activated in order to change an amount of current that device 401 is capable of sourcing to node through which cycle signal 206 propagates.

When the discharge cycle ends, and a charge cycle commences, cycle signal 303 transitions to a low logic level. This results in node 413 transitioning to a high logic level, disabling device 401. Additionally, node 416 transitions to a high logic level, which results in a low logic level on each input of the multiple NOR gates included in NOR gate 409.

At the beginning of the charge cycle, slope control signal 304 is at a low logic level, which prevents control bits 305 from propagating past NOR gate 410, thereby allowing all lines of bus 415 to transition to a high logic level. The high logic levels on the lines of bus 415 activates each device included in the multiple devices of device 402. As described below in more detail, as the voltage level of switch node 105 increases to a threshold value, slope control signal 304 transitions to a high logic level, which allows controls bits 305 to propagate, via respective ones of the NOR gates included in NOR gate 410, to NOR gate 409, which may de-assert particular lines of bus 415. The de-asserted lines of bus 415, in turn, deactivate corresponding ones of the multiple devices included in device 402, thereby reducing the amount of current that device 402 can discharge from the node through which control signal 106 propagates. By reducing the amount of current being discharged, the slope of signal increases, and the time for control signal 106 to transition from a high logic level to a low logic level decreases.

Figure 5:
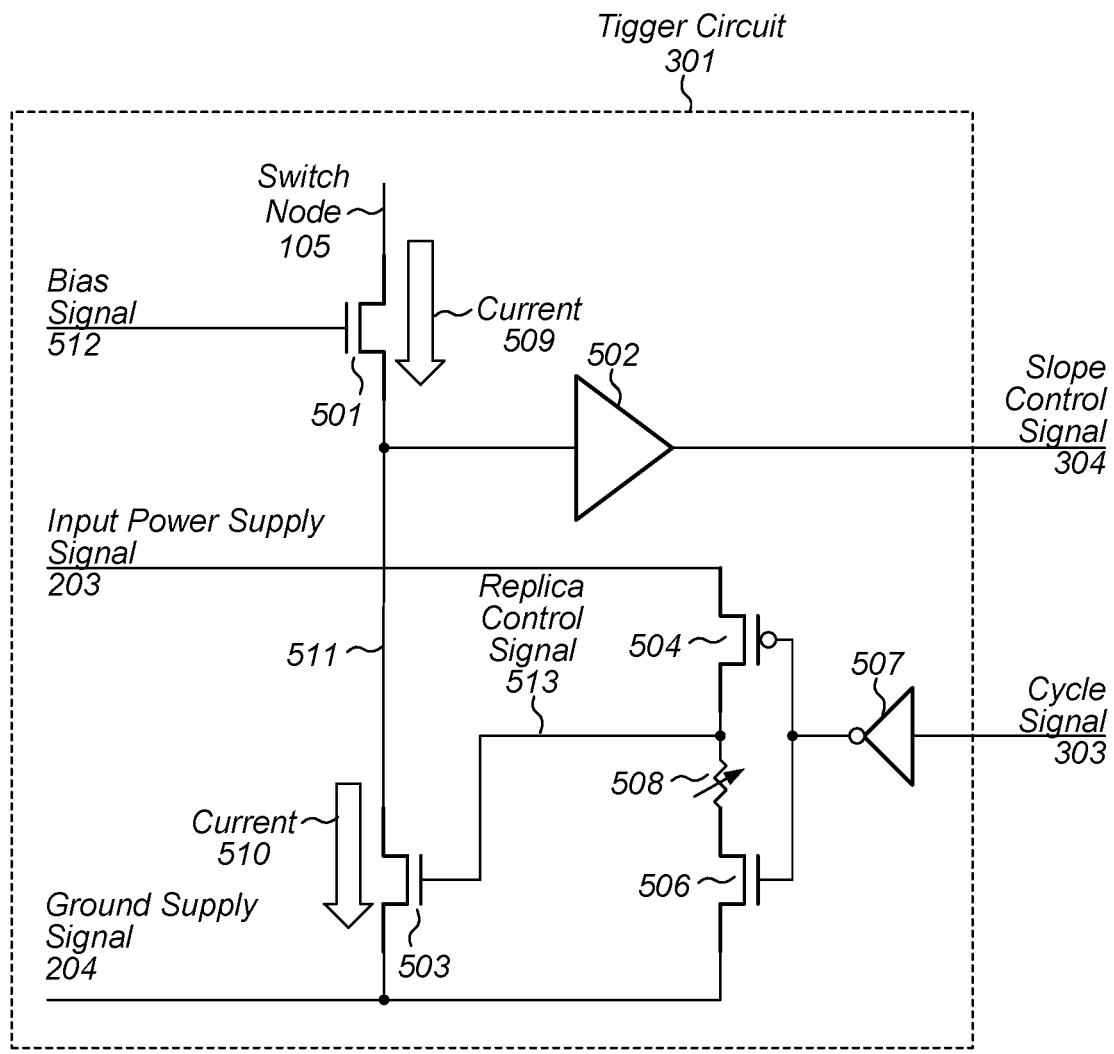
FIG. 5 illustrates a block diagram of an embodiment of a trigger circuit.

Turning to FIG. 5, a block diagram of an embodiment of trigger circuit 301 is depicted. As illustrated, trigger circuit 301 includes devices 501, 503, 504, and 506, detection circuit 502, variable resistor 508, and inverter 507.

Device 501 is coupled between switch node 105 and node 511 and controlled by bias signal 512. In various embodiments, device 501 may be a particular embodiment of a high-voltage device, i.e., device 501 may be manufactured such that it may have larger voltages across its terminals without damaging the device. In some cases, device 501 may be similar to device 202 of voltage regulator circuit 102. A value of current 509 may be determined based, at least in part on, a value of bias signal 512 and the respective voltage levels of switch node 105 and node 511. In various embodiments, the value of current 509 may be adjusted using bias signal 512 to adjust an amount of time from when the voltage level of switch node 105 begins to change to when slope control signal 304 is activated.

Device 503 is coupled between node 511 and ground supply node 204. A control terminal of device 503 is coupled to replica control signal 513, which is coupled to device 504 and variable resistor 508. Device 503 sinks current 510 from node 511 based, at least in part, on a voltage level on its control terminal. In various embodiments, device 503 may be a replica of device 202 as depicted in voltage regulator circuit 102.

In various embodiments, detection circuit 502 may be a particular embodiment of a Schmitt trigger or other suitable circuit configured to assert slope control signal 304 in response to a voltage level on node 511 reaching a threshold value. In various embodiments, detection circuit 502 may be configured to employ positive feedback by combining slope control signal 304 with the voltage level on node 511, and using the composite signal to generate the value of slope control signal 304. It is noted that in some embodiments, the threshold value at which detection circuit 502 asserts slope control signal 304 may be programmable based, at least in part, on values of parasitic circuit elements coupled to power converter circuit 100, power consumption of power converter circuit 100, and the like.

Device 504 is coupled between input power supply signal and variable resistor 508. Device 506 is coupled between variable resistor 508 and ground supply node 204. Control terminals of both device 504 and 506 are coupled to the output of inverter 507. In various embodiments, device 504 may be a particular embodiment of a p-channel MOSFET and device 506 may be a particular embodiment of an n-channel MOSFET. In some cases, device 506 may be a replica of device 402 as illustrated in FIG. 4. Variable resistor 508 may be a metal resistor, polysilicon resistors, or any other suitable type of resistor available on a semiconductor manufacturing process. In various embodiments, the value of variable resistor 508 is selected post-manufacture to fine tune the performance of trigger circuit 301.

Inverter 507 may be a particular embodiment of a CMOS inverting amplifier and is configured to invert the logical sense of cycle signal 303. In response to cycle signal 303 transitioning to a low logic level, the output of inverter 507 transitions to a high logic level, deactivating device 504 and activating device 506. As device 506 is activated, a voltage level of the control terminal of device 503 is discharged to ground, deactivating device 503.

During a discharge cycle, the voltage level of switch node 105 is decreasing, which, in turn, contributes to the voltage level of node 511 decreasing. Also, during a discharge cycle, cycle signal 303 is high, which results in a low value on the output of inverter 507. The low value on the output of inverter 507 deactivates device 506 and activates device 504, thereby pulling the control terminal of device 503 to a voltage level at or near that of input power supply node 203. Such a voltage level on the control terminal of device 503 activates device 503, which, in turn, sinks current 510 from node 511.

When the discharge cycle ends and a charge cycle beings, cycle signal 303 transitions to a low, thereby deactivating device 504 and activating device 506. The activation of device 506 discharges the control terminal of device 503, turning the device off. With device 503 no longer sinking current, the voltage level of node 511 increases in response to an increase in the voltage level of switch node 105.

Figure 6A:
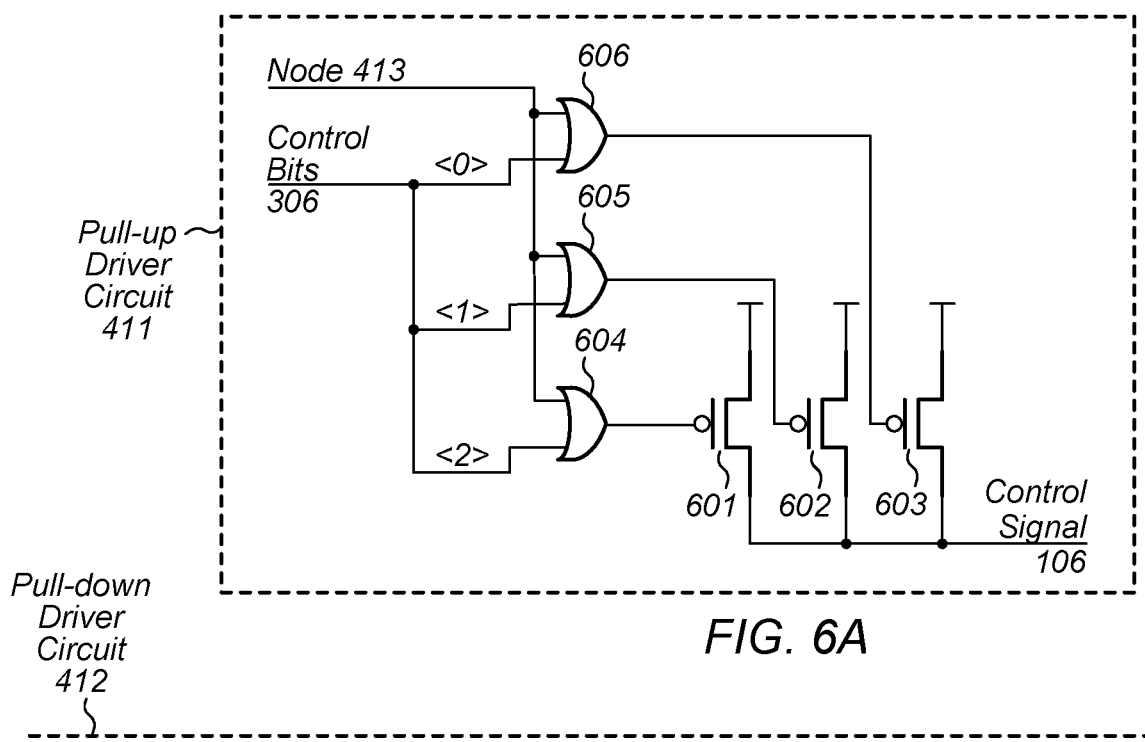
FIG. 6A illustrates a block diagram of an embodiment of a pull-up driver circuit.

Turning to FIG. 6A, a block diagram of an embodiment of pull-up driver circuit 411 is depicted. As illustrated, pull-up driver circuit 411 includes device 601-603, and OR gates 604-606.

Device 601-603 correspond to device 401 as illustrated in FIG. 1. Each of devices 601-603 are coupled between control signal 106 and a power supply signal, e.g., input power supply node 203. The control terminals of devices 601-603 are coupled to the outputs of OR gates 604-606, respectively. In various embodiments, each of devices 601-603 may be particular embodiments of p-channel MOSFETs or other suitable transconductance devices.

OR gates 604-606 correspond to OR gate 403 as illustrated in FIG. 4. Inputs of each of OR gates 604-606 are coupled to node 413 as well as respective ones of control bits 306. For example, one input of OR gate 604 is coupled to node 413, and the other input is coupled to bit <2> of control bits 306. OR gates 604-606 may be particular embodiments of a logic gate configured to generate an output that is the Boolean OR of its input logic levels. In various embodiments, OR gates 604-606 may be implemented using NOR gates and inverters, or any other suitable combination of logic gates.

In response to node 413 being set to a low logic level, individual ones of devices 601-603 may be activated based, at least in part, on the state of a corresponding one of control bits 306. For example, when both node 413 and bit <2> of control bits 306 are at low logic levels, OR gate 604 generates a low logic level on its output, thereby activating device 601, which, in turn, sources current to control signal 106, increasing its voltage level. By selecting which of control bits 306 are set to low logic levels, the amount of current sourced to control signal 106 may be adjusted in order to fine tune the operation of driver circuit 302.

Figure 6B:
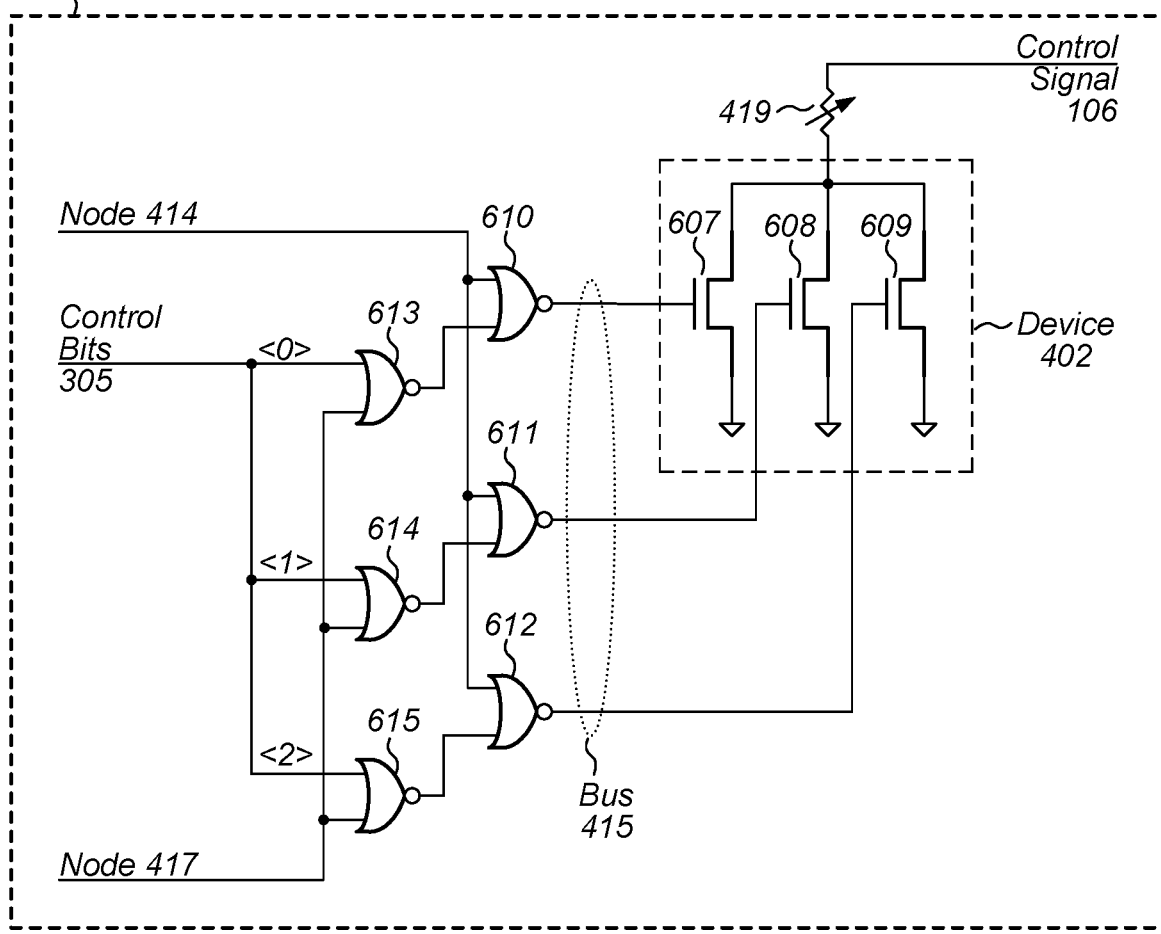
FIG. 6B illustrates a block diagram of an embodiment of a pull-down driver circuit.

A block diagram of an embodiment of pull-down driver circuit 412 is depicted in FIG. 6B. As illustrated, pull-down driver circuit 412 includes devices 607-609, variable resistor 616, and NOR gates 610-615. In various embodiments, devices 607-609 correspond to device 402 of FIG. 4, NOR gates 610-612 correspond to NOR gate 409 of FIG. 4, and NOR gates 613-615 correspond to NOR gate 410 of FIG. 4.

Each of devices 607-609 is coupled to control signal 106 via variable resistor 419 and a ground supply signal, e.g., ground supply node 204. The control terminals of devices 607-609 are coupled to respective outputs of NOR gates 610-612, respectively. Each of devices 607-609 may be particular embodiments of n-channel MOSFETs or other suitable transconductance devices. As described above, different ones of devices 607-609 may be selectively deactivated during a charge cycle to change the transition time of control signal 106.

NOR gates 613-615 correspond to NOTE gate 410 as illustrated in FIG. 4. Inputs of each of NOR gates 613-615 are coupled node 417 as well as respective ones of control bits 305. For example, one input of NOR gate 613 is coupled to node 417, and the other input of NOR gate 613 is coupled to bit <0> of control bits 305. Each of the outputs of NOR gates 613-615 is connected to an input of a corresponding on of NOR gates 610-612.

NOR gates 610-612 correspond to NOR gate 409 as illustrated in FIG. 4. Inputs of each of NOR gates 610-612 are coupled to node 414 as well as outputs of respective ones of NOR gates 613-615. For example, one input of NOR gate 610 is coupled to node 414, and the other input is coupled to the output of NOR gate 613.

NOR gates 610-615 may be particular embodiments of a logic circuit configured to generate an output that is the Boolean NOT-OR of the logic values at its inputs. In various embodiments, NOR gates 610-615 may be designed using any suitable combination of p-channel and n-channel MOSFETs, or other suitable transconductance devices.

Figure 7:
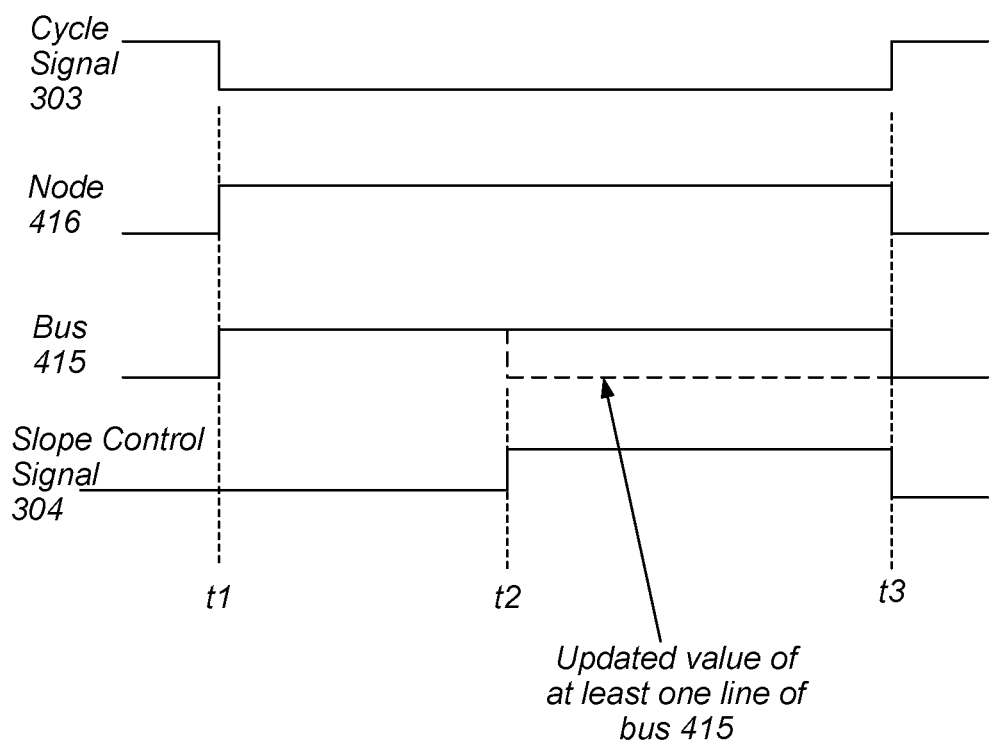
FIG. 7 illustrates example waveforms associated with the operation of a power converter circuit.

Waveforms illustrating the operation of power converter circuit 100 are depicted in FIG. 7. It is noted that the waveforms of FIG. 7 are merely examples, and that in other embodiments, the waveforms may appear different and the relative timings between waveforms may be different.

At time t1, cycle signal 303 transitions to a low logic level. In various embodiments, the change in logic value of cycle signal 303 may be a result of a determination that a discharge cycle of power converter circuit 100 has ended and a charge cycle has begun. The end of the discharge cycle may be determined using a clock signal or other timing signal, or as a result of a detection of an endpoint condition, e.g., a voltage level of switch node 105 reaching a particular voltage threshold.

In response to cycle signal 303 transitioning to a low logic level, node 416 transitions to a high logic level, which, in turn, transitions the lines of bus 415 to a high logic level. The high logic levels of the lines of bus 415 activates device 402, which includes devices 607609, discharging control signal 106, thereby activating device 201 in voltage regulator circuit 102.

At time t2, slope control signal 304 is asserted. As described above, the assertion of slope control signal 304 may be a result of trigger circuit 301 detecting that the voltage level of switch node 105 is beginning to increase. In response to the assertion of slope control signal 304, one or more lines of bus 415 in pull-down driver circuit 412 may transition to a low logic level based upon corresponding ones of control bits 305 (as indicated by updated value of at least one line of bus 415 in FIG. 7). As the one or more lines of bus 415 transition to a low logic level, corresponding ones of devices 607609 may deactivate, thereby decreasing a rate of increase, i.e., decreasing the slope, of control signal 106.

At time t3, cycle signal 303 transitions back to a high logic level. In response to cycle signal 303 transitioning to a high logic level, node 416 transitions to a low logic level, which, in turn, transitions the lines of bus 415 to low logic levels, thereby deactivating device 402. In various embodiments, the transition of cycle signal 303 may be a result of a detection of an end of a charge cycle of power converter circuit 100. In various embodiments, the end of the charge cycle may be based on a clock signal or other timing signal, or on a detection of a particular condition, such as the voltage level of the switch node reaching a different threshold value.

Figure 8:
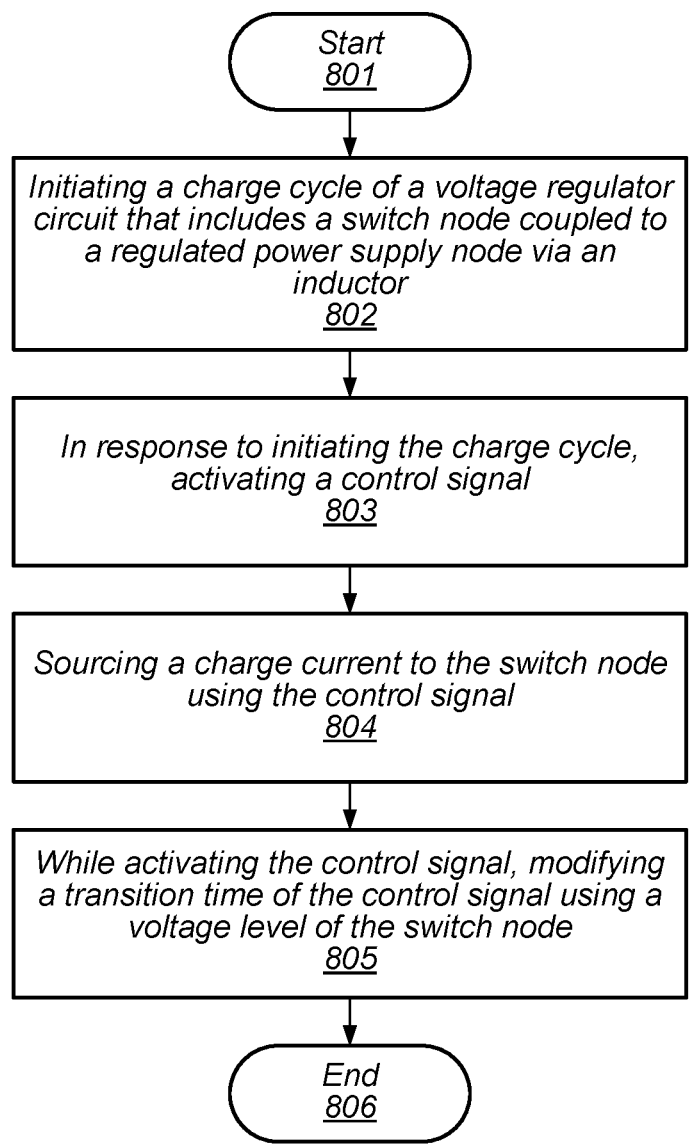
FIG. 8 illustrates a flow diagram depicting an embodiment of a method for operating a power converter circuit.

Turning to FIG. 8, a flow diagram depicting an embodiment of a method for operating a power converter circuit is illustrated. The method, which may be applied to power converter circuit 100 as depicted in FIG. 1, begins in block 801.

The method includes initiating a charge cycle of a voltage regulator circuit that includes a switch node coupled to a regulated power supply node via an inductor (block 802).

The method further includes, in response to initiating the charge cycle, activating a control signal (block 803). As noted above, initiating the charge cycle may be in response to the assertion of a clock signal or other timing reference signal.

In response to initiating the charge cycle, the method also includes sourcing a charge current to the switch node using the control signal (block 804). In various embodiments, sourcing the charge current to the switch node may include activating one or more of a first plurality of devices coupled to the control signal.

The method further includes, in response to initiating the charge cycle, while activating the control signal, modifying a transition time of the control signal using a voltage level of the switch node (block 805). In some embodiments, in modifying the transition time of the control signal, the method may also include decreasing a slope of the control signal.

The method may also include, in some embodiments, modifying the transition time using the voltage level of the switch node and a plurality of control bits. In various embodiments, the method may also include deactivating one or more devices of the first plurality of devices coupled to the control signal using respective ones of the plurality of control bits.

The method may, in some embodiments, include generating a first current using the voltage level of the switch node. In some cases, the method may further include generating a second current using a second plurality of devices that is a replica of the first plurality of devices. In various embodiments, the method also includes generating a slope control signal using a combination of the first current and the second current, and modifying the transition time of the control signal using the slope control signal. The method concludes in block 806.

Figure 9:
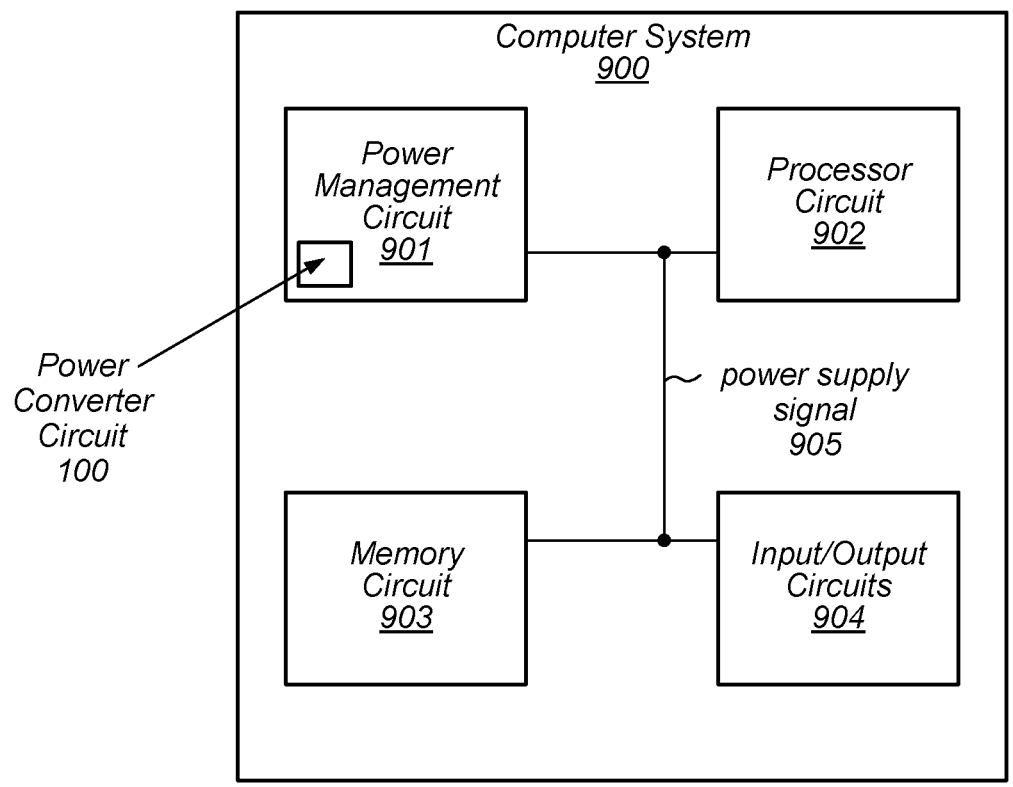
FIG. 9 depicts a block diagram of a computer system.

A block diagram of computer system is illustrated in FIG. 9. In the illustrated embodiment, the computer system 900 includes power management circuit 901, processor circuit 902, memory circuit 903, and input/output circuits 904, each of which is coupled to power supply signal 905. In various embodiments, computer system 900 may be a system-on-a-chip (SoC) and/or be configured for use in a desktop computer, server, or in a mobile computing application such as, e.g., a tablet, laptop computer, or wearable computing device.

Power management circuit 901 includes power converter circuit 100, which is configured to generate a regulated voltage level on power supply signal 905 in order to provide power to processor circuit 902, memory circuit 903, and input/output circuits 904. Although power management circuit 901 is depicted as including a single power converter circuit, in other embodiments, any suitable number of power converter circuits may be included in power management circuit 901, each configured to generate a regulated voltage level on a respective one of multiple internal power supply signals included in computer system 900. In cases where multiple power converter circuits are employed, two or more of the multiple power converter circuits may be connected to a common set of power terminals that connections to power supply signals and ground supply signals of computer system 900.

Processor circuit 902 may, in various embodiments, be representative of a general-purpose processor that performs computational operations. For example, processor circuit 902 may be a central processing unit (CPU) such as a microprocessor, a microcontroller, an application-specific integrated circuit (ASIC), or a field-programmable gate array (FPGA).

Memory circuit 903 may in various embodiments, include any suitable type of memory such as a Dynamic Random-Access Memory (DRAM), a Static Random-Access Memory (SRAM), a Read-Only Memory (ROM), Electrically Erasable Programmable Read-only Memory (EEPROM), or a non-volatile memory, for example. It is noted that although in a single memory circuit is illustrated in FIG. 9, in other embodiments, any suitable number of memory circuits may be employed.

Input/output circuits 904 may be configured to coordinate data transfer between computer system 900 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 904 may be configured to implement a version of Universal Serial Bus (USB) protocol or IEEE 1394 (Firewire®) protocol.

Input/output circuits 904 may also be configured to coordinate data transfer between computer system 900 and one or more devices (e.g., other computing systems or integrated circuits) coupled to computer system 900 via a network. In one embodiment, input/output circuits 904 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 904 may be configured to implement multiple discrete network interface ports.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
    a voltage regulator circuit including a switch node coupled to a regulated power supply node via an inductor, wherein the voltage regulator circuit is configured to source a charge current to the switch node in response to an assertion of a control signal; and
    a control circuit configured to:
        in response to an initiation of a charge cycle, assert the control signal; and
        adjust, during an assertion of the control signal, a slope of a transition of the control signal using:
            a first current whose value is based on a voltage level of the switch node, and
            a second current generated using a replica of a particular device included in the voltage regulator circuit.

2. The apparatus of claim 1, wherein in the control circuit is further configured to adjust the slope of the transition of the control signal using a plurality of control bits and a programmable delay time.

3. The apparatus of claim 2, wherein the control circuit is further configured to adjust the first current using a bias signal to adjust the programmable delay time.

4. The apparatus of claim 3, wherein the control circuit includes a first plurality of devices coupled to the control signal, and wherein each device of the first plurality of devices is configured to discharge a circuit node using a respective one of the plurality of control bits and a slope control signal, wherein the control signal propagates in the circuit node.

5. The apparatus of claim 4, wherein the control circuit is further configured to:
   source the first current to a particular circuit node; and
   a sink the second current from the particular circuit node.

6. The apparatus of claim 5, wherein the control circuit is further configured to compare a voltage of the particular circuit node to a threshold value to generate the slope control signal.

7. A method, comprising:
   initiating a charge cycle of a voltage regulator circuit that includes a switch node coupled to a regulated power supply node via an inductor;
   in response to initiating the charge cycle:
   activating a control signal; and
   sourcing a charge current to the switch node using the control signal; and
   modifying, during said activating of the control signal, a transition time of the control signal using;
   a first current whose value is based on a voltage level of the switch node; and
   a second current generated using a replica of a particular device included in the voltage regulator circuit.

8. The method of claim 7, wherein modifying the transition time of the control signal includes decreasing a slope of the control signal.

9. The method of claim 7, further comprising, modifying the transition time of the control signal using the voltage level of the switch node and a plurality of control bits and a programmable delay time.

10. The method of claim 9, wherein modifying the transition time of the control signal includes deactivating one or more devices of a first plurality of devices coupled to the control signal using respective ones of the plurality of control bits.

11. The method of claim 10, further comprising, adjusting the first current using a bias signal to adjust the programmable delay time.

12. The method of claim 11, further comprising, souring the first current to a particular circuit node.

13. The method of claim 12, further comprising:
   sinking the second current from the particular circuit node; and
   comparing a voltage level of the particular circuit node to a threshold value to generate a slope control signal.

14. An apparatus, comprising:
   a voltage regulator circuit including a switch node coupled to a regulated power supply node via an inductor, wherein the voltage regulator circuit is configured to source a charge current to the switch node in response to an activation of a charge cycle;
   a driver circuit configured to transition, in response to the activation of the charge cycle, a regulator control signal from a first value to a second value; and
   a trigger circuit configured to generate, in response to the activation of the charge cycle, a slope control signal using;
   a first current whose value is based on a voltage level of the switch node; and
   a second current generated using a replica of a device in the voltage regulator circuit; and
   wherein the driver circuit is further configured to modify a rate of change of the regulator control signal during its transition from the first value to the second value using the slope control signal.

15. The apparatus of claim 14, wherein the driver circuit is further configured to transition the regulator control signal using a cycle control signal.

16. The apparatus of claim 14, wherein the driver circuit is further configured to modify the rate of change of the regulator control signal using the voltage level of the switch node and a plurality of control bits and a programmable delay time.

17. The apparatus of claim 16, wherein the driver circuit includes a first plurality of devices coupled to the regulator control signal, and wherein to modify the rate of change of the regulator control signal, the driver circuit is further configured to deactivate one or more devices of the first plurality of devices using values of respective ones of the plurality of control bits.

18. The apparatus of claim 17, wherein the trigger circuit is further configured to the first current using a bias signal to adjust the programmable delay time.

19. The apparatus of claim 17, wherein the trigger circuit includes a Schmitt trigger circuit configured to generate the slope control signal using a voltage level that is based on a combination of the first current and the second current.

20. The apparatus of claim 14, wherein the first value corresponds to a logic 0 value and the second value corresponds to a logic 1 value.

* * * * *